(12) United States Patent
Cote et al.

(10) Patent No.: US 6,752,013 B2
(45) Date of Patent: Jun. 22, 2004

(54) DEVICE AND METHOD FOR WEB TENSION MEASUREMENT

(75) Inventors: Kevin Lauren Cote, Durham, NH (US); Lothar John Schroeder, Portsmouth, NH (US)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 09/726,240

(22) Filed: Nov. 29, 2000

(65) Prior Publication Data

US 2002/0062689 A1 May 30, 2002

(51) Int. Cl.$^7$ ............................................. G01L 5/04
(52) U.S. Cl. ................................................. 73/159
(58) Field of Search .................. 73/159, 160, 862.391, 73/826, 829; 226/44, 45, 118.2, 118.3; 242/419.7, 413.5, 418.1, 419.1, 420.3, 420.6, 421.7

(56) References Cited

U.S. PATENT DOCUMENTS

| | | | | |
|---|---|---|---|---|
| 3,777,959 A | | 12/1973 | Seney ........................... | 226/25 |
| 4,095,063 A | * | 6/1978 | Herzhoff et al. ............... | 73/159 |
| 4,144,700 A | * | 3/1979 | Takai et al. .................... | 73/160 |
| 4,159,808 A | | 7/1979 | Meihofer .................. | 242/75.51 |
| 4,663,862 A | | 5/1987 | Gorissen ...................... | 34/561 |
| 4,733,829 A | * | 3/1988 | Mima ........................ | 73/160 X |
| 5,176,334 A | | 1/1993 | Dreschau et al. ........... | 242/75.5 |
| 5,188,028 A | | 2/1993 | Reichel ....................... | 101/228 |
| 5,472,127 A | | 12/1995 | Ichii et al. ..................... | 226/44 |
| 5,595,115 A | * | 1/1997 | Rau et al. ................... | 101/142 |
| 5,718,799 A | * | 2/1998 | Colson et al. .............. | 156/578 |
| 5,791,541 A | | 8/1998 | Jitsuishi et al. ................ | 226/40 |

FOREIGN PATENT DOCUMENTS

| | | |
|---|---|---|
| DE | 1951088 | 4/1971 |
| DE | 1774714 | 10/1971 |
| DE | 2127993 | 12/1972 |
| DE | 3020847 | 1/1981 |
| DE | 3940744 | 6/1991 |
| DE | 4003659 | 8/1991 |
| DE | 4019108 | 12/1991 |
| DE | 4027938 | 3/1992 |
| DE | 9315076 | 2/1994 |
| DE | 4232635 | 3/1994 |
| EP | 0161223 | 11/1985 |
| EP | 0869093 | 10/1998 |
| GB | 995874 | 6/1965 |
| GB | 1048175 | 11/1966 |
| GB | 1396387 | 6/1975 |
| GB | 1484185 | 9/1977 |
| JP | 01321263 | 3/1990 |

\* cited by examiner

*Primary Examiner*—Max Noori
(74) *Attorney, Agent, or Firm*—Davidson, Davidson & Kappel, LLC

(57) ABSTRACT

A web tension measurement device includes a roller for a web of material, the movable roller having an axis of rotation moveable in a first direction by the web; a counteracting device connected to the movable roller, the counteracting device for forcing the axis of the roller in a second direction opposite the first direction; and a controller connected to the counteracting device for measuring the web tension. Also included is a method for measuring tension in a web which comprises the steps of running a web over a roller, an axis of the roller being movable in a first direction, counteracting the movement of the roller in a second direction opposite the first direction, and measuring a counteracting force or a variable so as to be able to determine a web tension.

13 Claims, 2 Drawing Sheets

DEVICE AND METHOD FOR WEB TENSION MEASUREMENT

BACKGROUND OF THE INVENTION

1. Field of the Invention

The present invention relates generally to printing presses and more particularly to a device and method for measuring or controlling web tension in a printing press.

2. Background Information

Web printing presses print a continuous web of material, such as paper. In a printing unit of the printing press the continuous web is printed with an image, and then the web is folded and cut into signatures. The process of printing an image to the web, as well as folding of the web, creates tension in the web. Correct tension should be maintained in the web during the process of printing and folding.

One way to measure the correct tension is through a tension transducer device. However, existing tension transducers are analog devices that require frequent calibration and are subject to damage if overloaded. Also, the bandwidth of existing tension transducers is insufficient for some applications. Furthermore, existing tension transducer designs consist of strain gauge assemblies mounted in the end of tension rolls. The assemblies make some applications, e.g., measuring web tension on a driven roll or on a liquid cooled roll, difficult, expensive, or impossible.

BRIEF SUMMARY OF THE INVENTION

An object of the present invention is to stabilize a roll by counteracting the force produced on the roll by the web tension. An additional or alternative object of the present invention is to provide a simpler device to produce web tension information from rolls. Yet another additional or alternative object of the present invention is to provide a device that can act as both a compensator and a tension measuring device in a web span.

The present invention provides a device for measurement of web tension comprising:

a roller for contacting a web of material, the roller having a rotational axis, the axis being movable in a first direction by the web;

a counteracting device connected to the roller, the counteracting device for forcing the axis of the roller in a second direction opposite the first direction; and a controller connected to the counteracting device for measuring the web tension.

With the roller and counteracting device of the present invention, web tension information may be easily and efficiently obtained. Moreover, the controller allows the present invention to function as both a ribbon compensator and a tension measuring device in a given web span.

The movable roller may comprise a liquid cooled roll. Advantageously, the liquid cooled roll improves performance of web printing.

Preferably, the counteracting device is a motor. The motor provides the advantage of allowing the present invention to operate at higher tensions with less likelihood of damaging or jamming.

The controller, preferably, is a solid state device. The use of a solid state controller eliminates frequent calibration of the present invention.

The web tension measurement device may include a plurality of lever arms, a pivot shaft, a plurality of drive sprockets, a belt, a counteracting device shaft, and/or a roll shaft, with each device mechanically linked to the counteracting device.

The present invention also includes a method for measuring tension in a web comprising the steps of:

running a web over a roller having an axis, the axis of the roller being movable in a first direction;

counteracting the movement of the axis in a second direction opposite the first direction; and measuring a counteracting force or a variable so as to determine a web tension.

The roller may remain stationary in the method for measuring tension in the web. Advantageously, maintaining the roller in a stationary position simplifies obtaining web tension information.

In a preferred embodiment, the roller may be rotatable in a lever or lever arm about a pivot axis, where a web compensator algorithm determines the desired position of the roller. The rotation about a pivot axis provides the advantage of allowing the roller to perform the tension measurement function as well as functioning as a web or ribbon compensator.

BRIEF DESCRIPTION OF THE DRAWINGS

A preferred embodiment of the present invention is described below by reference to the following drawings, in which.

DETAILED DESCRIPTION

Figure 1:
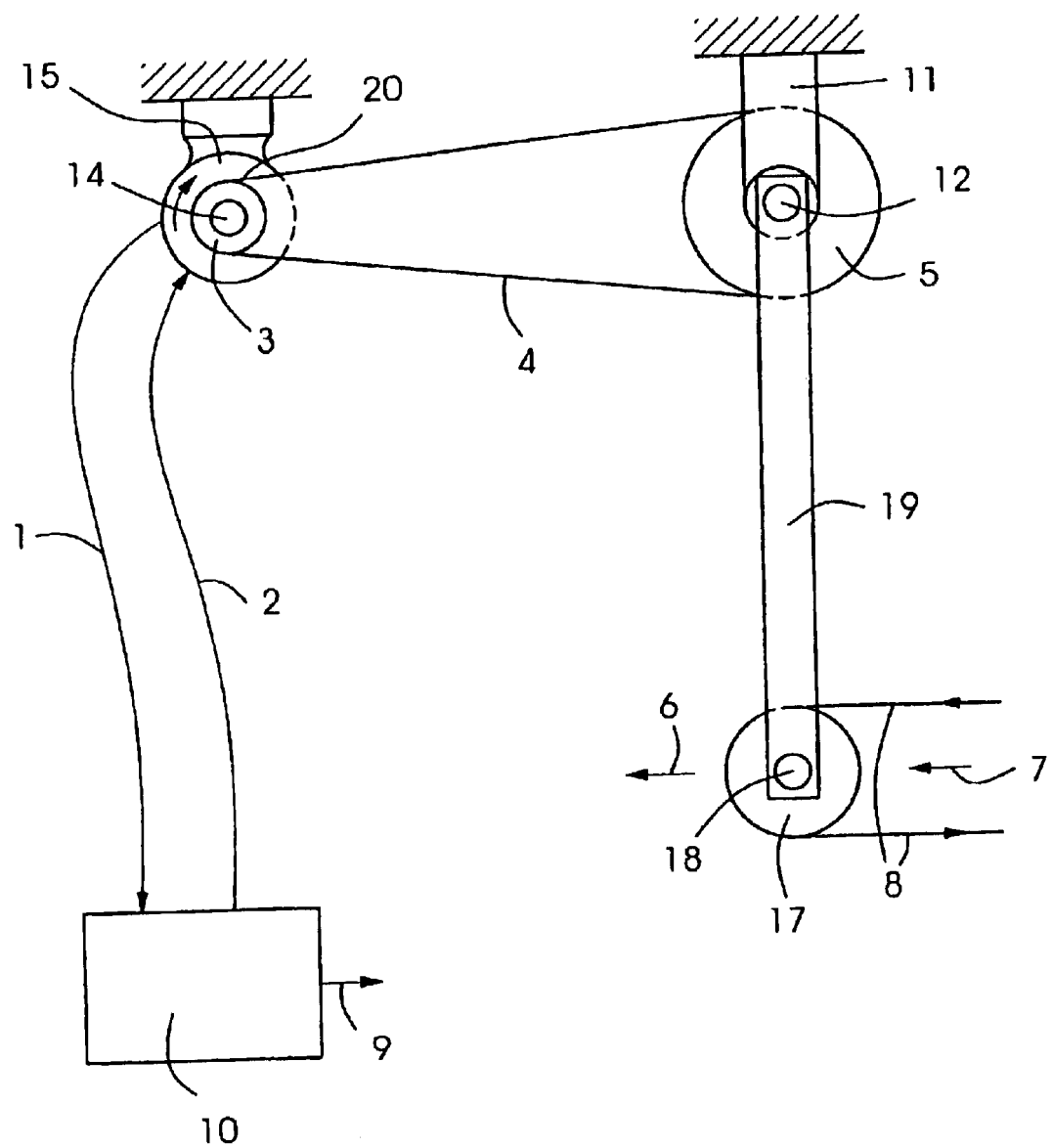
FIG. 1 shows a schematic side view of the web tension measurement device, which shows a web.

FIG. 1 shows a schematic side view of the web tension measurement device, which shows a web 8 moving over a roller 17. Roller 17 has a shaft or axis of rotation 18. The operation of the printing press causes the tension in the web 8 to exert a displacement force in a first direction 7 on a movable roller 17. The roll shaft 18 of movable roller 17, which can be a liquid cooled roll or a driven roll, thus is forced in direction 7. The roll shaft 18, in turn, exerts a force on a first lever arm 19 and a second lever arm 16 (see FIG. 2), which both rigidly connect to a pivot shaft 12. The first and second lever arms 19, 16 thus create a torque in the pivot shaft 12. The pivot shaft 12, which is mounted in a first bracket 11 and a second bracket 13 (see FIG. 2), imparts the torque to a first drive sprocket 5. The first drive sprocket 5 passes the torque to a second drive sprocket 3 via a belt 4, which preferably has a toothed inner surface. The rotation of the second drive sprocket 3 conveys the torque to a counteracting device shaft 14 through a rigid connection with the counteracting device shaft 14. The counteracting device shaft 14 connects to a counteracting device 15, for example a motor, and thus, imparts the torque to the counteracting device 15.

As described below, the counteracting device 15, controlled by controller 10, provides an exactly opposite torque to the device shaft 14, so that shaft 14 does not move. The controller 10 thus provides a zero position signal to the counteracting device 15, so that the counteracting device 15 counter-acts the torque imparted by the counteracting device shaft 14 with the counteracting device torque 20 that is opposite to the torque imparted by the counteracting device shaft 14. As such, the counteracting device torque 20 stabilizes the counteracting device shaft 14. The counteracting device shaft 14, in turn, prevents the rotation of the second drive sprocket 3, which prevents the rotation of the first drive sprocket 5 by use of the belt 4. The first drive sprocket 5 prevents the rotation of the pivot shaft 12, and the pivot shaft 12, in turn, stabilizes the first and second lever arms 19, 16. The first and second lever arms 19, 16 stabilize the movable roller 17 so that axis 18 remains stationary. Thus, the movable roller 17 exerts a second displacement force in a second direction 6 equal to and opposite to the first displacement force that is caused by the tension in the web 8.

The controller 10, which can be a solid state device or a microprocessor, reads a value representing a torque 20 on motor 15 or shaft 14 through a first connection 1. The controller then sends a zero command via a second connection 2 to a counteracting device 15, e.g., a motor, causing the counteracting device 15 to maintain the zero position so that shaft 14 does not rotate. The controller 10 then converts the value sent via connection 1 representing counteracting device torque 20 to a measurement of web tension as a function of the length of the first and second lever arms 19, 16, the diameter of the movable roller 17, and the ratio of the first drive sprocket 5 to the second drive sprocket 3. The controller 10 then outputs the measurement of web tension as a digital signal 9.

Figure 2:
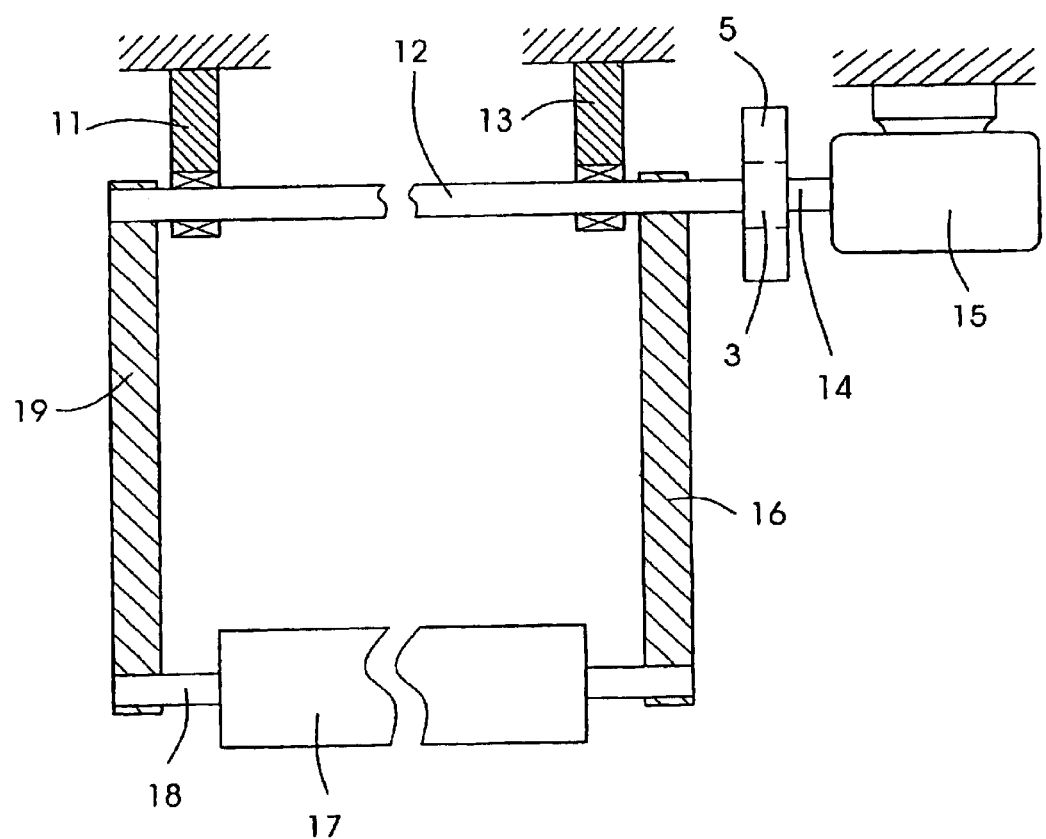
FIG. 2 shows a schematic front view of the web tension measurement device, which shows the counteracting device and the second lever arm.

FIG. 2 shows a schematic front view of the web tension measurement device, which shows the counteracting device 15 and the second lever arm 16. The movable roller 17 is rigidly mounted to the roll shaft 18, and the roll shaft 18 is mounted to and allowed to rotate in the first and second lever arms 19, 16. Also shown is the pivot shaft 12 rigidly connected to the first and second lever arms 19, 16 and mounted on the first and the second brackets 11, 13. The pivot shaft 12, which freely rotates in the first and second brackets 11, 13, rigidly connects to the first drive sprocket 5. The belt 4 provides a connection between the first drive sprocket 5 and the second drive sprocket 3 (see FIG. 1). The second drive sprocket 3 rigidly connects to the counteracting device shaft 14, which is connected to the counteracting device 15.

In another embodiment, the controller 10 may send a position command to the counteracting device 15 by the first connection 2. The position command, which is based on a desired change in the position of the movable roller 17 as determined by a normal compensator routine, causes the counteracting device 15 to change the counteracting device torque 20, so that the change in torque causes the first and second lever arms 19, 16 to rotate about a pivot axis of the pivot shaft 12 and thus, permits the movable roller 17 to move. The counteracting device 15 then adjusts the counteracting device torque 20 by subtracting the torque required to accelerate the mechanical parts of the present invention from the counteracting device torque 20, thus, setting the counteracting device torque 20 again equal to the torque due to the web tension. The device thus can act as a web tension compensator.

The counteracting device 15 preferably is an electric motor with a shaft.

What is claimed is:

1. A web tension measurement device comprising:

a roller for a contacting a web of material, the roller having an axis of rotation, the axis being moveable in a first direction by the web and having a first position;

a counteracting device connected to the roller, the counteracting device forcing the roller in a second direction opposite the first direction; and a controller connected to the counteracting device for measuring the web tension, the controller for measuring the web tension and maintaining the roller in the first position.

2. The web tension measurement device as recited in claim 1 wherein the roller is a liquid cooled roll.

3. The web tension measurement device as recited in claim 1 wherein the counteracting device is a motor.

4. The web tension measurement device as recited in claim 1 wherein the controller is a solid state device.

5. The web tension measurement device as recited in claim 1 further comprising a plurality of lever arms, each lever arm mechanically linked to the counteracting device, the plurality of lever arms supporting the roller.

6. The web tension measurement device as recited in claim 1 further comprising a pivot shaft mechanically linked to the counteracting device.

7. The web tension measurement device as recited in claim 1 further comprising a plurality of drive sprockets, each drive sprocket mechanically linked to the counteracting device.

8. The web tension measurement device as recited in claim 7 further comprising a belt connected to at least one of the drive sprockets.

9. The web tension measurement device as recited in claim 1 wherein the counteracting device has a shaft.

10. A method for measuring tension in a web comprising the steps of:

running a web over a roller, the roller having an axis movable in a first direction and having a first position;

counteracting the movement of the axis in a second direction opposite the first direction using a counteracting device; and measuring a counteracting force or a variable using the counteracting device so as to be able to maintain the roller in the first position.

11. The method for measuring tension as recited in claim 10 wherein the roller remains stationary.

12. The method for measuring tension as recited in claim 10 wherein the roller is rotatable in a lever or lever arm about a pivot axis.

13. The method for measuring tension as recited in claim 12 further including the step of moving the axis of the roller based on a web compensator algorithm.

* * * * *